(12) United States Patent
Yates

(10) Patent No.: US 9,230,342 B1
(45) Date of Patent: Jan. 5, 2016

(54) RAPID TRUNCATION OF DIGITAL CONTENT

(75) Inventor: Andrew Joseph Yates, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 574 days.

(21) Appl. No.: 13/533,831

(22) Filed: Jun. 26, 2012

(51) Int. Cl.
*G06T 9/40* (2006.01)

(52) U.S. Cl.
CPC .................................. *G06T 9/40* (2013.01)

(58) Field of Classification Search
None
See application file for complete search history.

(56) References Cited

U.S. PATENT DOCUMENTS

| 6,430,624 | B1* | 8/2002 | Jamtgaard et al. | 709/246 |
| 2005/0144555 | A1* | 6/2005 | Morris | 715/513 |
| 2008/0139191 | A1* | 6/2008 | Melnyk et al. | 455/419 |
| 2008/0238919 | A1* | 10/2008 | Pack | 345/420 |
| 2008/0307328 | A1* | 12/2008 | Hatcher et al. | 715/760 |
| 2010/0174778 | A1* | 7/2010 | Yuan et al. | 709/203 |

\* cited by examiner

*Primary Examiner* — Andrew G Yang
(74) *Attorney, Agent, or Firm* — Lee & Hayes, PLLC; Shivshanker Naimpally

(57) ABSTRACT

Some implementations create a representation of content to enable the representation to be displayed on a computing device. For example, the computing device may be a portable device that has a display device with a size that is constrained relative to other display devices. The representation may be created to enable the computing device to display the representation while maintaining a hierarchical structure of the content. To create the representation, the hierarchical structure of the content may be traversed and at least a portion of some of the nodes of the hierarchical structure may be selected for inclusion in the representation.

23 Claims, 5 Drawing Sheets

RAPID TRUNCATION OF DIGITAL CONTENT

BACKGROUND

A large and growing population of users enjoy entertainment through the consumption of digital content items (or simply "content items"), such as music, movies, images, electronic books, and so on. The users employ various computing devices to consume such content items. Among these computing devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance the user experience continues to be a priority.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
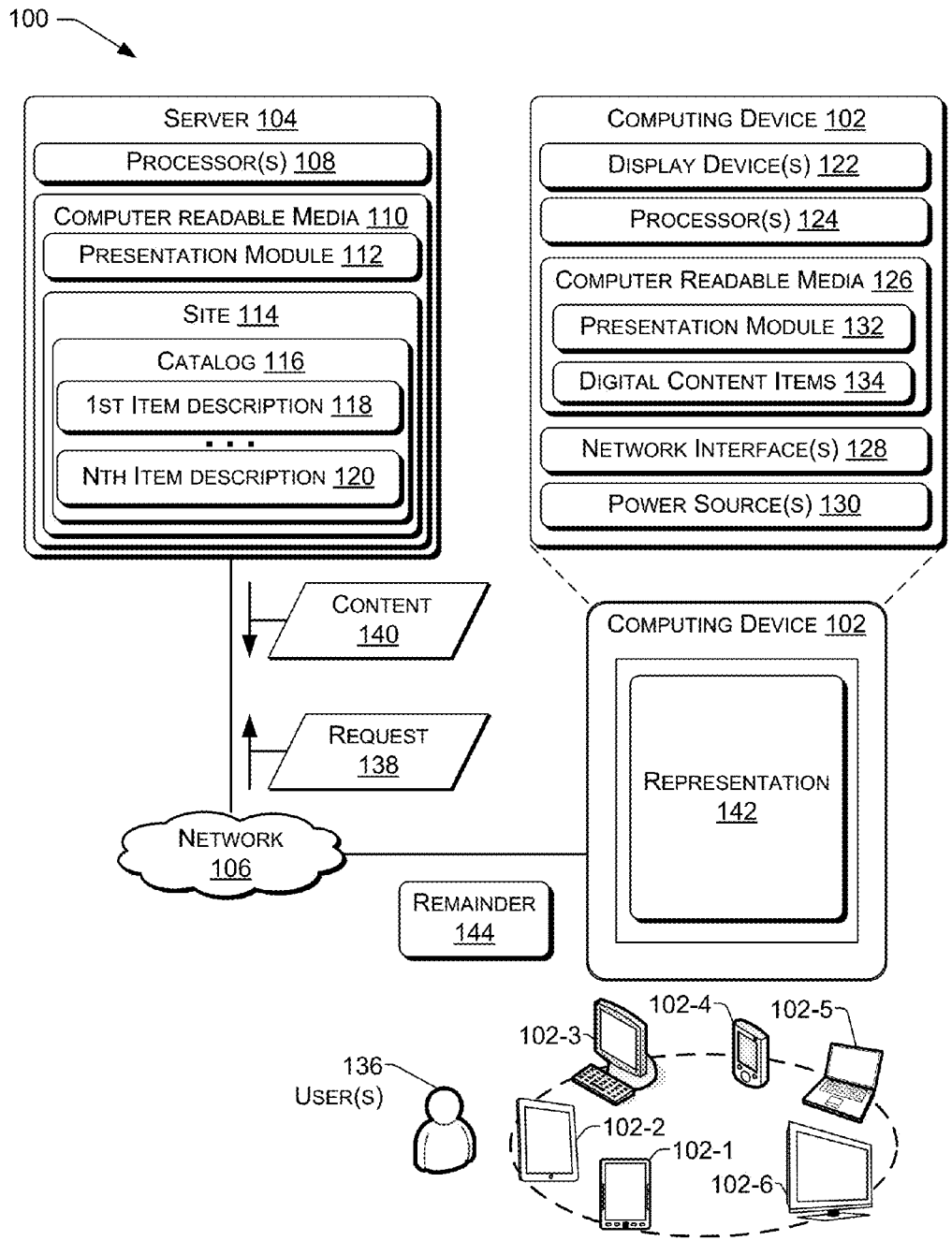
FIG. 1 is an illustrative architecture that includes displaying a representation of content on a computing device according to some implementations.

Individuals may browse sites, such as merchant sites or other sites that display content, using a computing device. In some cases, individuals may purchase, rent, lease, license, borrow, or otherwise acquire items, such as services, digital content items, and physical items from one or more of the sites. For example, the digital content items may include music content items, video content items, or digital publications (e.g., electronic books (eBooks) or electronic periodicals). The physical items may include electronic devices, appliances, tools, household items, apparel, toys, sporting goods, or the like.

The computing devices used to access the sites may include personal computing devices, tablet computing devices, media playback devices, mobile phone devices, gaming consoles, or any combination thereof. Some computing devices may be devices that have relatively small displays as compared to a desktop computing device or a laptop computing device. Displaying content from a site on a device with a relatively small display may prove challenging. For example, the content may be formatted for display on larger displays and may not fit completely on smaller displays. To accommodate devices with smaller displays (e.g., tablet devices or mobile phones), a representation of the content may be displayed on such devices. For example, portions of the content may be truncated to enable the content to be displayed on devices with smaller displays while retaining a structure associated with the content.

The content on a site may be organized in a hierarchical structure, such as a tree structure. For example, the content may use a document object model (DOM) to structure the content. To preserve the structure of the content, portions of the hierarchical structure may be truncated to enable the content to be displayed on devices with smaller displays. In some cases, one or more truncation characters, such as ellipsis (e.g., " . . . "), may be used to indicate that portions of the content have been truncated.

The representation corresponding to the content may be created by an application executing on the computing device, an application executing on a server that hosts the site from which content is being displayed, or a combination thereof. The computing devices may include a variety of display sizes, a variety of operating systems (e.g., Microsoft Windows™, Google Android™, Apple iOS, and the like), a variety of presentation applications (e.g., browsers, such as Internet Explorer, Chrome, Safari, etc.), or any combination thereof. An algorithm used to create the representation may be designed such that the algorithm is platform-independent to accommodate the various display sizes, operating systems, and presentation applications that may be used by a computing device to access the sites.

The techniques described herein may be used to create a representation corresponding to content provided by a site. The representation may be displayed on a computing device, such as a computing device with a relatively small display. The structure of the representation may be similar to the structure of the corresponding content, thereby enabling the representation to be navigated in a manner similar to the way in which the content is navigated. The techniques may be implemented across multiple platforms to enable multiple devices to create and display the representation.

An application may create a representation corresponding to content available at a network-accessible site based on the hierarchical structure of the content. For example, the application may determine a root node of the hierarchical structure and determine one or more size constraints associated with the computing device. The root node may be a node that is at a topmost level of the hierarchical structure. The one or more size constraints may be related to the display of the computing device and may include a minimum height in pixels, a maximum height in pixels, a minimum width in pixels, a maximum width in pixels, or any combination thereof. For example, the size constraint may be a percentage of a size of the display (e.g., screen) of the computing device. Of course, the one or more size constraints may be expressed using other types of measurements. In some implementations, the size constraints may be specified as a range that includes a minimum (e.g., minimum height, minimum width, or both) and a maximum (e.g., maximum height, maximum width, or both).

After determining the root node of the structure and the size constraints, the algorithm may determine whether a size of the root node exceeds the size constraints. If the size of the root node does not exceed the size constraints, the root node and all nodes hierarchically below the root node may be selected for inclusion in the representation. If the size of the root node does not exceed the size constraints, then the content may not be truncated prior to displaying the content on the computing device. The size of a node, such as the root node, may be determined in many different ways. For example, a bounding box (e.g., a rectangle or other geometric shape) may be placed around the contents of the node and the size of the bounding box may be determined. The size of the bounding box may be expressed in a variety of measurement systems, such as a height in pixels and a width in pixels. In some implementations, a bounding box may be used for each level of the hierarchical structure.

If the size of the root node exceeds the size constraints, then the application may determine whether the root node is a leaf node or a parent node. A leaf node is a node in a hierarchical structure that does not have any child nodes (e.g., child nodes are nodes at a hierarchically lower level in the structure than a parent node that branch off from the parent node). A parent node is a node in a hierarchical structure that has at least one child node at a hierarchically lower level in the structure than the parent node. If the root node is a leaf node, the application may select a portion of the leaf node for inclusion in the representation while excluding a remainder of the content. Thus, when the root node is a leaf node, the application may select a portion of the leaf node and truncate the remainder of the leaf node. One or more characters (e.g., ellipsis) may be included in the representation to indicate that the remainder of the content was truncated. In some cases, the one or more characters (e.g., ellipsis) may be specified by a user of the computing device while in other cases one or more default characters may be selected.

If the root node is a parent node, the application may identify one or more child nodes of the parent node. The one or more child nodes may be at a level that is lower than the level of the parent node. The application may treat each of the one or more child nodes in a manner similar to the way in which the root node was treated. For example, the application may determine a size of each child node, determine whether the size of each child nodes exceeds the one or more size constraints, determine whether each of the child nodes are a leaf node or a parent node, determine a portion of each leaf node to select for inclusion in the representation and so on. In some cases, the application may be implemented as a recursive algorithm that repeatedly calls itself until adding a next child node at an Nth level (where N>0) may cause the representation to exceed the one or more size constraints. The application may then select a portion of the next child node while truncating a remainder of the next child node such that inclusion of the selected portion does not cause the representation to exceed the one or more size constraints. Of course, the techniques described herein may be implemented using various algorithms, such as a recursive algorithm, a "while loop" (e.g., while a size of the representation is less than the size constraint, process a next node), or another type of algorithm that achieves a similar result.

In some implementations, a range object may be implemented in a scripting language, such as Javascript, and used to select portions of content that first within the range object. The nodes and/or portions of the nodes that are selected for inclusion in the representation at a particular level of the hierarchical structure may be concatenated with previously identified nodes and/or portions. By concatenating the results at each level of the hierarchical structure, the algorithm may be platform independent. For example, different browsers may implement range objects differently, resulting in the range objects yielding varying results if the ranges are not separated at each level of the hierarchical structure. If the ranges were not separated at each level of the hierarchical structure, some browsers may fail to truncate properly, resulting in a poorly created representation that does not accurately correspond to the content. Thus, the algorithm may run at the least granular level possible at each step to provide improved efficiency. When a node exceeds the size constraints, if the node is a parent node, the child nodes of the parent node may be selected. When the last node that exceeds the size constraints is a leaf node (e.g., the leaf node includes text content), the algorithm may estimate a number of characters of the text content to include in the representation. The algorithm may include an amount of the text content such that the representation including the scanned content does not exceed the size constraints. An experimental cascading style sheets (CSS) utility, known as line-clamp, is an unsupported webkit property that may limit a number of lines of text displayed in a block element. However, line-clamp does not correctly handle non-uniformly styled content resulting in line-clamp incorrectly (i) showing a bit of the next line or (ii) prematurely choping a height of a final line of content. Line clamp operates by taking a sample (e.g., a first line of text or a first character), determining a height of the sample, and multiplying the height by a desired number of lines to determine an approximate height. However, if a subsequent line has a style that is different from the sample, the approximation is inaccurate.

Thus, a network-accessible site host may provide content to multiple computing devices. At least some of the computing devices may have relatively small displays. For example, some of the computing devices may include tablet computing devices or mobile phones. The content may be organized in a hierarchical structure, such as a tree structure. For example, the content may include hypertext markup language (HTML) content, extended markup language (XML) content, extended HTML (XHTML), a document object model (DOM), another type of hierarchical structure, or any combination thereof. A software application executing on the computing device, a software application executing on the server, or a combination of both may create a representation of the content for display on the computing device. For example, the representation may be created based on size constraints associated with the computing device. The software application may use an algorithm, such as a recursive algorithm, to repeatedly select nodes from the hierarchical structure to create the representation. In some cases, a set of characters, such as an ellipsis, may be added to the representation to identify the portions of the content that were truncated when creating the representation.

The software application may load a representation corresponding to a page of content using the techniques described herein in an average of 30 milliseconds or less. In contrast, a conventional DOM manipulation-based approach may load the representation in an average of 1100 milliseconds or more. Thus, the algorithm described herein may significantly improve a user's experience when viewing content from a site. In addition, the algorithm may be suitable for implementation on multiple platforms (e.g., various combinations of hardware devices and operating systems). Furthermore, the algorithm may be efficient and may use very few computing resources (e.g., memory space, disk space, processor cycles, or the like), such that the representation corresponding to the content may be created in main memory (e.g., in-memory content truncation).

Illustrative Architectures

FIG. 1 is an illustrative architecture 100 that includes displaying a representation of content on a computing device according to some implementations. The architecture 100 includes a computing device 102 coupled to a server 104 via a network 106. The server 104 may host a storefront that enables the acquisition (e.g., purchase, rental, and the like) of digital content items for consumption by the computing device 102. In addition, the server 104 may provide cloud-based services, including storing digital content items that may be consumed by the computing device 102. The network 106 may include one or more networks, such as a wireless local area network (e.g., WiFi®), a wireless wide area network (e.g., a code division multiple access (CDMA), a global system for mobile (GSM) network, or a long term evolution (LTE) network), a wired network (e.g., Ethernet), other type of network, or any combination thereof.

The server 104 may include one or more processors 108 and computer readable media 110. The computer readable media 110 may include a presentation module 112 to provide content from the site 114 for display on multiple computing device, such as the computing device 102. The computer readable media 110 may host one or more sites, such as a site 114. The site 114 may include a catalog 116 offering multiple items for acquisition. The catalog 116 may include descriptions of N items (where N>0) available for acquisition, such as a first item description 118 and an Nth item description 120. The N item descriptions 118 to 120 may include information describing the N items, photographs of the N items, user reviews of the N items, tags associated with the N items, other information associated with the N items, or any combination thereof. An item may be a physical item (e.g., goods), a service, digital content (e.g., audio content and/or video content) or any combination thereof. The term acquire as used herein may refer to purchasing, leasing, renting, licensing, borrowing or otherwise receiving access to an item. The server 104 may include multiple physical and/or virtual servers.

The computing device 102 may be an eBook reader device (e.g., 102-1), a tablet computing device (e.g., 102-2), a personal computing device (e.g., 102-3), a personal digital assistant (PDA) device (e.g., 102-4), a portable gaming console (e.g., 102-4), a mobile phone device (e.g., 102-4), a media playback device (e.g., 102-4), a laptop computing device (e.g., 102-5), a monitor or a television (e.g., 102-6) or any combination thereof. The computing device 102 may include one or more display devices 122, one or more processors 124, a computer-readable media 126, one or more network interfaces 128, and one or more power sources 130. For example, the one or more controllers 122 may include display controllers, input controllers (e.g., keyboard, mouse, and/or joystick), etc. In some cases, the display device 120 may include an electronic ink display, such as an electrophoretic display. The network interfaces 128 may enable the computing device 102 to communicate with other devices over the network 106. For example, the network interfaces 128 may enable the computing device 102 to send and/or receive messages from other computing devices, browse content hosted on various sites, download digital items from sites, and perform other network-based activities. The power sources 130 may include an adapter to convert AC power to DC power, battery power, or other types of power sources.

The computer-readable media 126 may be used to store a presentation module 132, a set of digital content items 134, devices drivers, an operating system, software applications, and the like. For example, the set of digital content items 134 may include electronic books (eBooks), media files (e.g., video files, audio files etc.), and other digital content capable of being stored in the computer-readable media 126.

The computer-readable media 110 and 126 may include memory, such as volatile memory, non-volatile memory, removable memory, and/or non-removable memory, implemented in any method or technology for storage of information, such as computer-readable instructions, data structures, program modules, or other data. Also, the processors 108 and 124 may include onboard memory in addition to or instead of the computer-readable media 110 and 126, respectively. Examples of storage media that may be included in the computer-readable media 110 and 126 and/or processor(s) 108 and 124 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 108 and 124. Any such computer-readable storage media may be part of the computing device 102 and the server 104. The computer-readable media 110 and 126 may include software programs or other executable modules that may be executed by the processor(s) 108 and 124, respectively. The computer-readable media 110 and 126 may be used to store device drivers, an operating system, software applications, and the like.

In operation, one or more users 136 may use the computing device 102 to display content 140 available on sites accessible over the network 106, such as the site 114. For example, one of the users 136 may send a request 138 to server 104 to display a selected portion of the site 114. In response to the request 138, the server 104 may provide the content 140 to the computing device 102. The presentation module 132, the presentation module 112, or a combination of both may create a representation 142 that corresponds to the content 140 for display on the computing device 102. For example, the representation 142 may be created based on one or more size constraints associated with the display devices 122. A remainder 144 of the content 140 may not be displayed on the display devices 122. In some implementations, the presentation module 132 may enable one of the users 136 to select (e.g., toggle) between displaying the representation 142 and displaying the remainder 144 on the display devices 122.

Thus, the presentation module 132, the presentation module 112, or a combination of both may create the representation 142 corresponding to content 140 for display on the display devices 122. The representation 142 may be a portion of the content 140 that is selected to be displayed on the display devices 122 based on one or more size constraints associated with the display devices 122.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 108 or 124, as hardware, and/or as firmware. Typically, the functionality of the program modules may be combined or distributed as desired in various embodiments. An implementation of these modules and techniques may be stored on or transmitted across some form of computer-readable media.

The modules stored in the computer-readable media 110 or 126 may be implemented across one or more servers in a cloud computing environment, on a local device, or on a combination of both. The following discussion does not limit the implementation of the modules stored in the computer-readable media 110 or 126 to any particular device or environment.

Furthermore, while FIG. 1 sets forth an example of a suitable architecture to provide digital documentation, numerous other possible architectures, frameworks, systems and environments will be apparent to those of skill in the art in view of the disclosure herein.

Figure 2:
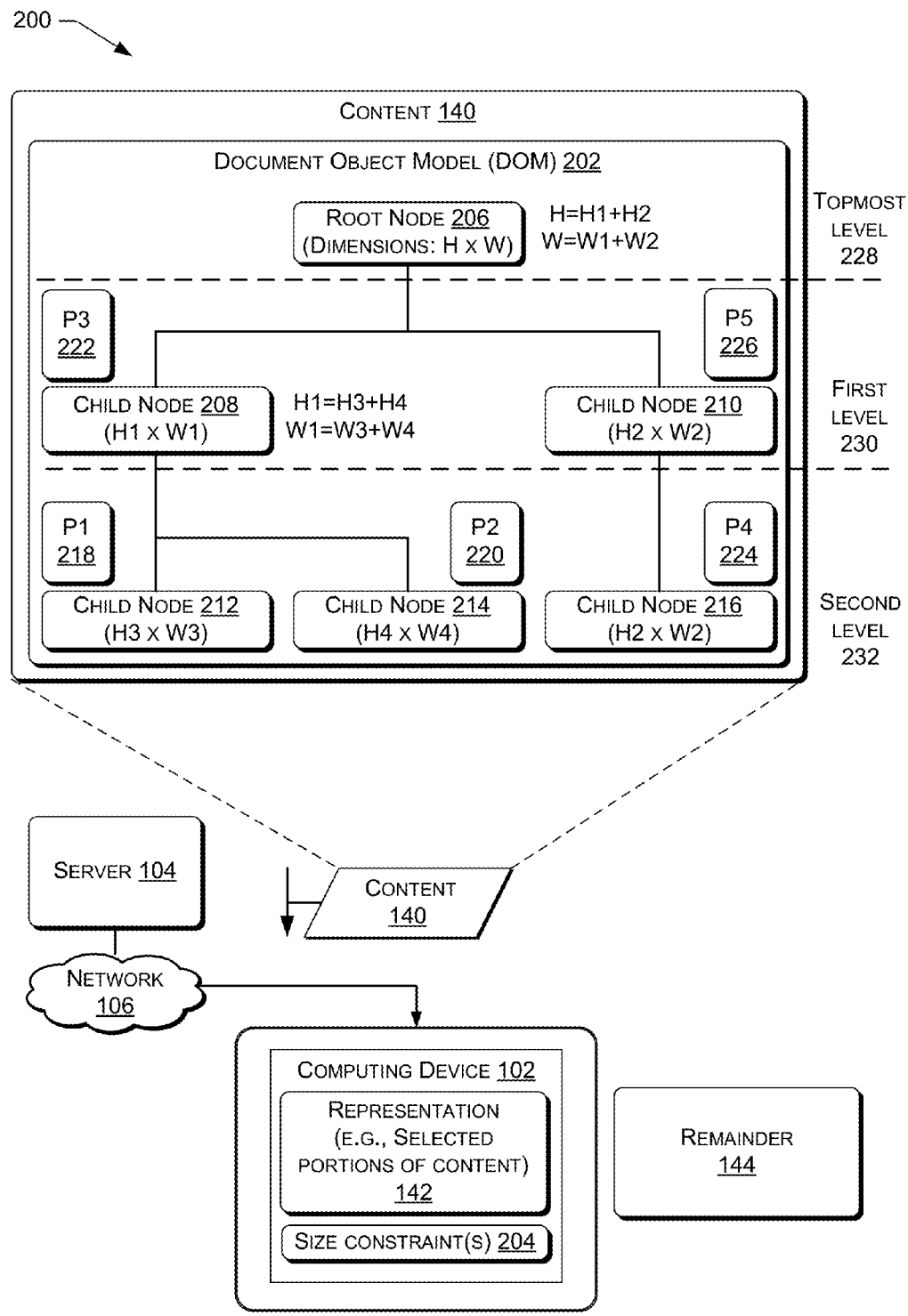
FIG. 2 is an illustrative architecture that includes hierarchically organized content according to some implementations.

FIG. 2 is an illustrative architecture 200 that includes hierarchically organized content according to some implementations. In FIG. 2, the content 140 is organized using a hierarchical structure, such as a document object model (DOM) 202. Of course, the DOM 202 is used as an example, and any other type of hierarchical structure may be used. A software application, such as the presentation module 132 of FIG. 1, may implement an algorithm to create the representation 142. The algorithm may determine one or more size constraints 204. For example, the size constraints 204 may be associated with the display devices 122 of FIG. 1. The algorithm may determine a root node 206 of the DOM 202. The root node 206 may be a node that is at a topmost level 228 of the hierarchical structure (e.g., the DOM 202).

The algorithm may determine whether the root node 206 exceeds the size constraints 204. If the root node 206 does not exceed the size constraints 204, the algorithm may select the root node 206 as the representation 142 and display the representation 142 on the computing device 102.

If the root node 206 exceeds the size constraints 204, the algorithm may determine whether the root node 206 is a leaf node or a parent node. A leaf node is a node in the DOM 202 that does not have any associated child nodes at a lower-level. A parent node is a node in the DOM 202 that has one or more associated child nodes at a lower-level. If the root node 206 was a leaf node, the algorithm may select a portion of the root node 206 for inclusion in the representation 142. For example, if the root node 206 was a leaf node, the root node 206 may be comprised of text and/or graphics, and the algorithm may select a portion of the text and/or graphics for inclusion in the representation 142 based on the size constraints 204. However, as illustrated in FIG. 2, the root node 206 is a parent node with two child nodes. Thus, the algorithm may determine that the root node 206 is parent node with a child node 208 and a child node 210 at a first level 230 that is lower than the topmost level 228.

The algorithm may call itself recursively for each of the child nodes 208 and 210. The algorithm may continue traversing the nodes of the DOM 202 until including any additional content in the representation 142 would cause the representation 142 to exceed the size constraints 204. For example, the algorithm may determine whether the child node 208 exceeds the size constraints 204. If the child node 208 does not exceed the size constraints 204, the child node 208 may be included in the representation 142. If the child node 208 exceeds the size constraints 204, the algorithm may determine whether the child node 208 is a leaf node or a parent node. If the child node 208 is a leaf node, the algorithm may select a portion of the text in the leaf node for inclusion in the representation.

If the child node 208 is a parent node, the algorithm may identify additional child nodes, such as a child node 212 and a child node 214, of the parent node 208. The child nodes 212 and 214 may be at a second level 232 that is lower than the first level 230. The algorithm may recursively call itself for the child nodes 212 and 214. In FIG. 2, the algorithm may determine whether each of the child nodes 212 and 214 exceed the size constraints 204. If the child node 212 does not exceed the size constraints 204, the algorithm may include the child node 212 in the representation 142. If the child node 212 exceeds the size constraints 204, the algorithm may determine that the child node 212 is a leaf node and select a portion of the child node 212 for inclusion in the representation 142 based on the size constraints 204. If the child node 214 does not exceed the size constraints 204, the algorithm may include the child node 214 in the representation 142. If the child node 214 exceeds the size constraints 204, the algorithm may determine that the child node 214 is a leaf node and select a portion of the child node 214 for inclusion in the representation 142 based on the size constraints 204.

The algorithm may determine whether the child node 210 exceeds the size constraints 204. If the child node 210 does not exceed the size constraints 204, the child node 210 may be included in the representation 142. If the child node 210 exceeds the size constraints 204, the algorithm may determine whether the child node 210 is a leaf node or a parent node. If the child node 210 is a leaf node, the algorithm may select a portion of the text in the leaf node.

If the child node 210 is a parent node, the algorithm may identify a child node 216 of the parent node 210. The child node 216 may be at the second level 232 that is lower than the first level 230. The algorithm may recursively call itself for the child node 216. In FIG. 2, the algorithm may determine whether the child node 216 exceeds the size constraints 204. If the child node 216 does not exceed the size constraints 204, the algorithm may include the child node 216 in the representation 142. If the child node 216 exceeds the size constraints 204, the algorithm may determine that the child node 216 is a leaf node and select a portion of the child node 216 for inclusion in the representation 142 based on the size constraints 204.

Thus, at each level of the DOM 202, a portion of the content at that level may be selected for inclusion in the representation 142. Each time the algorithm is called, the algorithm may select at least a portion of a node for inclusion in the representation 142. The portion selected for inclusion at a particular level may be concatenated to a previously identified portion and a size of the representation 142 may be determined. Thus, the algorithm may keep a running total as to a size of the representation 142. In some implementations, the algorithm may determine an amount that has been truncated and thereby keep a running total of an amount of the remainder 144 that has been truncated from the content 140. For example, as illustrated in FIG. 2, after determining that the node 208 has two child nodes 212 and 214, a portion P3 222 may be created. The portion P3 222 may be a shell, e.g., empty, at this point. The node 208 may be treated as a parent node by recursively invoking the algorithm with the node 208. A portion P1 218 of the child node 212 and a portion P2 226 of the child node 214 may be identified at the second level 232. The portions P1 218 and P2 226 may be concatenated and placed in the portion P3 222 at the first level 230. A portion P4 224 may be identified at the second level 232 and may be placed in a portion P5 226 at the first level 230. Thus, the resulting representation 142 may be a concatenation of the portions P1 218, P2 220, P3 222, P4 224, and P5 226.

A size of a node in the DOM 202 may be the sum of the sizes of the child nodes associated with the node. For example, the root node 206 may have dimensions H×W, where H is the height in pixels and W is the width in pixels. The root node 206 has child nodes 208 and 210 with the respective dimensions H1×W1 and H2×W2 (where H1 and H2 are the height in pixels and W1 and W2 are the width in pixels). In this example, H=H1+H2 and W=W1+W2, e.g., the dimensions of the root node 206 are the sum of the dimensions of the child nodes 208 and 210 associated with the root node 206. The size of a node, such as the root node 206, may be determined by placing a bounding box around the content of the node and then determining the dimensions of the bounding box, as described in more detail in FIG. 3.

The dimensions of the child node 208 may be a sum of the dimensions of the child nodes 212 and 214, that are at a lower level in the DOM 202 than the child node 208. For example, if the child node 212 has dimensions H3×W3 and the child node 214 has dimensions H4×W4, then the dimensions of the child node 208 may be expressed as a H1=H3+H4 and W1=W3+W4. The dimensions of the child node 210 may be a sum of any additional child nodes associated with the child node 210. In FIG. 2, the child node 210 has a single child node 216. Thus, the dimensions of the child node 210 may be the dimensions of the child node 216. For example, both the child node 210 at the first level 230 and the child node 216 at the second level 232 may have the dimensions H2×W2.

Thus, content provided by a site for display on a computing device may be organized in a hierarchical structure, such as the DOM 202. An algorithm may be used to select a portion of the content 140 for inclusion in the representation 142. In some implementations, the algorithm may be implemented recursively, while in other implementations, the algorithm may be implemented using a loop or similar algorithm. The algorithm may repeatedly select nodes or portions of the nodes from the DOM 202 for inclusion in the representation 142, such that the representation 142 does not exceed the size constraints but includes an organizational structure that is similar to the content. Portions of the content of at least some of the nodes of the DOM 202 may be truncated and excluded from the representation 142. The representation 142 may also be referred to as a selected portion of the content 140 (e.g. "the selection") while the portions of the content 140 that are not included in the representation 142 may be referred to as the remainder 144.

Figure 3:
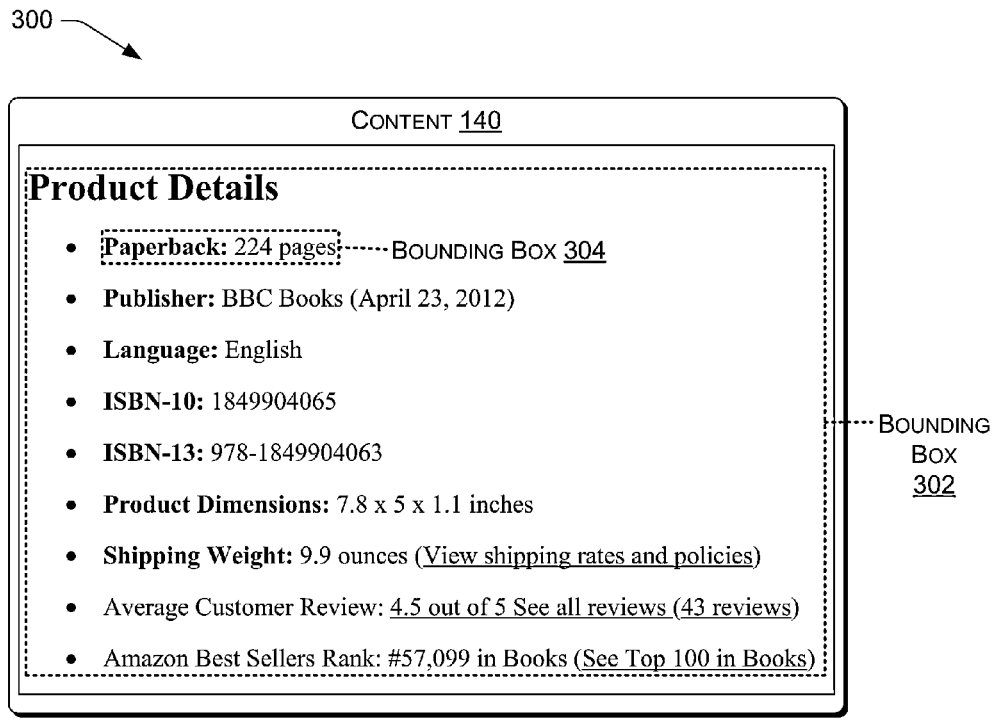
FIG. 3 is an illustrative architecture that includes content and a corresponding representation according to some implementations.
Figure 3:
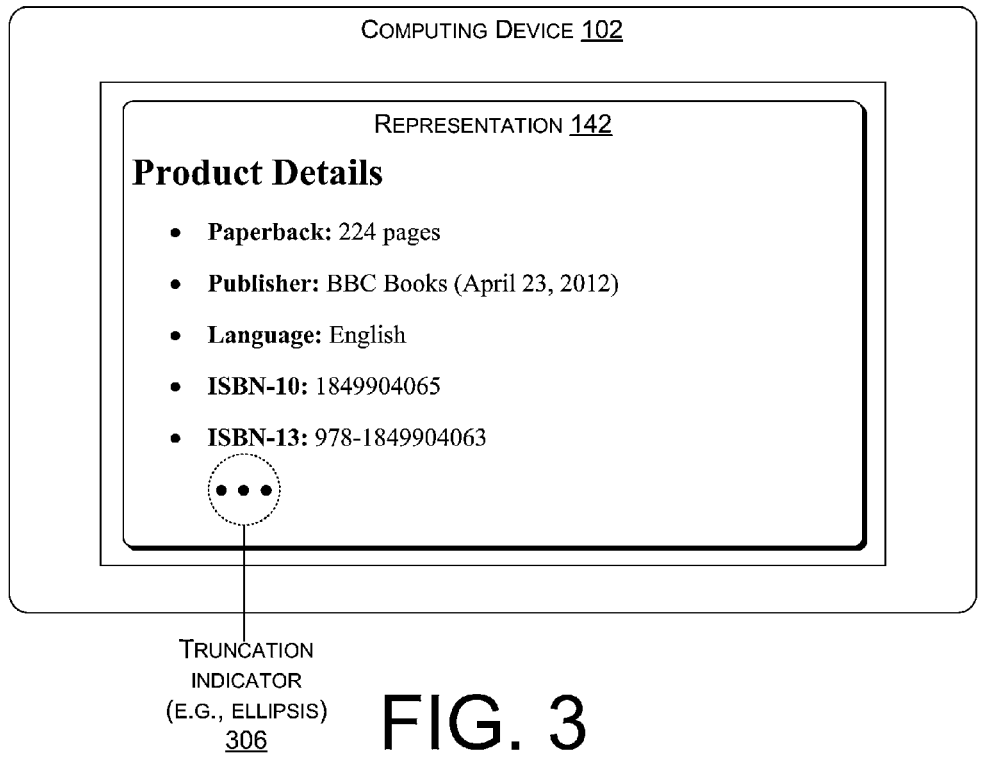

FIG. 3 is an illustrative architecture 300 that includes content and a corresponding representation according to some implementations. For example, the content 140 may be part of an item description displayed on a site, such as the site 114 of FIG. 1. In the example illustrated in FIG. 3, the "product details" may be a root node of the structure of the content 140 while the remaining bulleted points may be child nodes of the root node. In the example illustrated in FIG. 3, the size constraint may be associated with a vertical size (e.g., height) of a display of the computing device 102. The algorithm may add nodes (e.g., starting with "paperback") to a representation and keep a running total of a size of the representation until adding a next node would result in the representation exceeding the vertical size constraint.

To determine a size of a node in the content 140, a bounding box may be created such that the content of the node is completely included in the bounding box. For example, a bounding box 302 may be created around the root node (e.g., "product details") and a size of the root node may be determined by determining the dimensions of the bounding box 302. As another example, a size of a child node (e.g., "paperback") may be determined by creating a bounding box 304 around the content of the child node and determining the dimensions of the bounding box 304. A bounding box may be used for each level (e.g., topmost, first level, second level, etc.) of the DOM 202.

In some implementations, the algorithm may add a set of characters (e.g., one or more characters), referred to as a truncation indicator 306, to the representation 142 to identify which portions of the content 140 were truncated. Prior to adding the truncation indicator 306, the algorithm may remove one or more characters from the representation 142, such that the representation 142 including the truncation indicator 306 does not exceed the size constraints. In the example illustrated in FIG. 3, ellipsis (e.g., " . . . ") may be used as the truncation indicator 306. Because the ellipsis includes three characters, the algorithm may remove three characters at each location in the representation 142 where a portion (e.g., a leaf node) of the content 140 was truncated.

The truncation indicator 306 may be used to indicate that certain nodes and/or portions of certain nodes (e.g., "publisher", ISBN-13" and "product dimensions") were truncated and not included in the representation 142. The truncation indicator 306 may be used to indicate that certain nodes (e.g., "shipping weight", "average customer review" and "Amazon best sellers rank") were truncated from the content 140 and not included in the representation 142.

Example Processes

Figure 4:
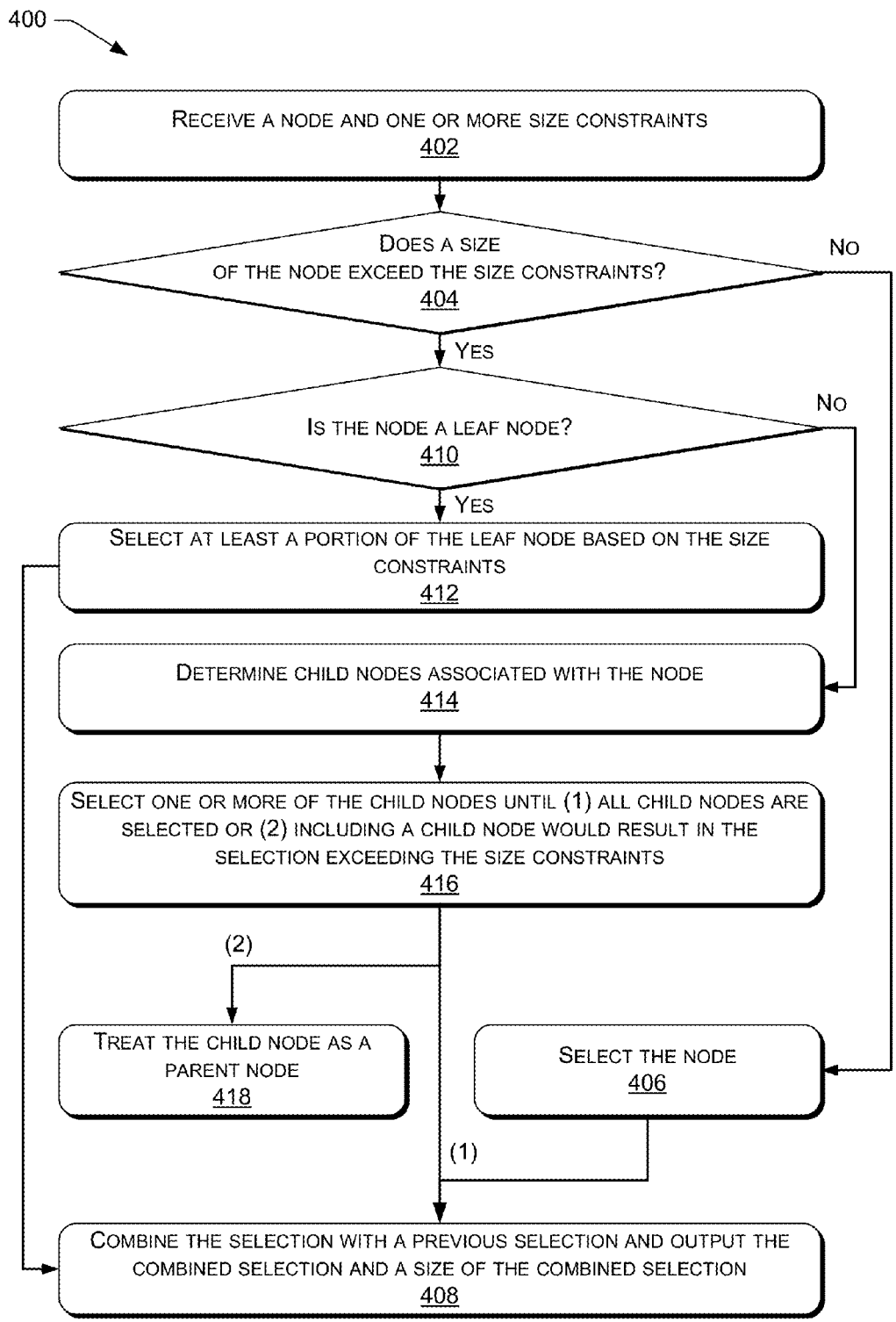
FIG. 4 is a flow diagram of an example process that includes determining whether a node is a leaf node according to some implementations.
Figure 5:
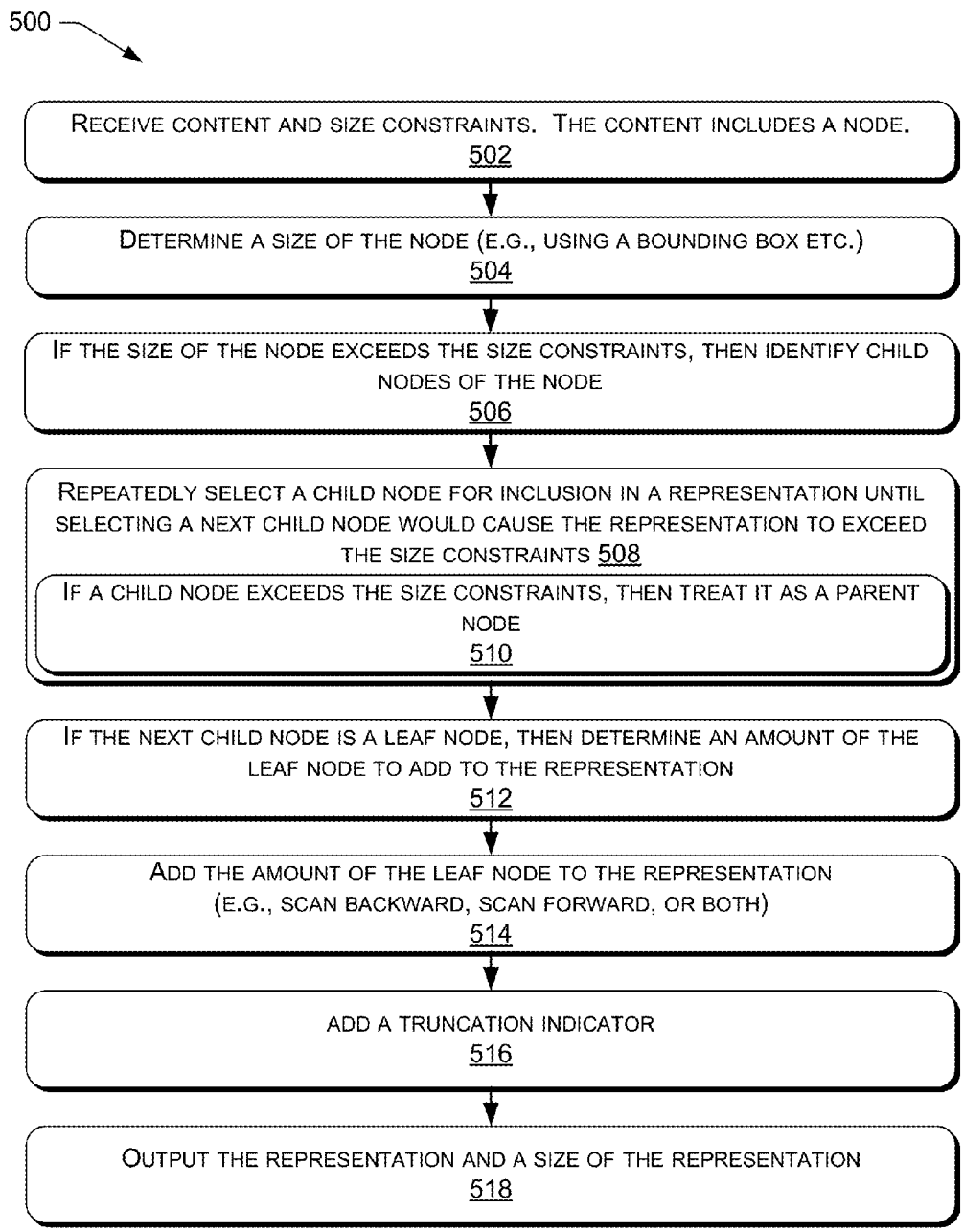
FIG. 5 is a flow diagram of an example process that includes treating a child node as a parent node according to some implementations.

In the flow diagrams of FIGS. 4-5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to the architectures 100, 200, and 300 as described above, although other models, frameworks, systems and environments may implement these processes.

FIG. 4 is a flow diagram of an example process 400 that includes determining whether a node is a leaf node according to some implementations. The process 400 is described as a recursive algorithm. However, in other implementations, an algorithm that loops over the nodes at each level may be used to achieve results similar to the process 400. The process 400 may be performed by a presentation module such as the presentation module 112 of FIG. 1, the presentation module 132 or a combination of both.

At 402, a node and one or more size constraints may be received. For example, in FIG. 2, the root node 206 and the size constraints 204 may be received by the algorithm. In some cases, a previously selection of content may also be received by the algorithm. For example, if the algorithm is recursively called multiple times, previously selected content (e.g., for inclusion in the representation) may be passed along with the node and the one or more size constraints. Initially, when the algorithm is called using the root node of the hierarchical structure of the content, there may be no previously selected content. However, subsequent calls to the algorithm may pass along the previously selected content to enable the algorithm to concatenate the previously selected content with additional selected content.

At 404, a determination may be made whether a size of the node exceeds the size constraints. For example, in FIG. 2, the algorithm may determine whether the size of the root node 206 exceeds the size constraints 204. The size of the root node 206 may be determined using a bounding box, such as the bounding box 302 or 304 of FIG. 3.

If a determination is made that a size of the node does not exceed the size constraints, at 404, then the process proceeds to 406 where the node may be selected (e.g., for inclusion in the representation). For example, in FIG. 2, if the algorithm determines that one of the nodes 206, 208, 210, 212, 214, or 216 has a size that is less than the size constraints 204, the algorithm may select the node for inclusion in the representation 142.

At 408, the selection may be combined (e.g., concatenated) with a previous selection and the concatenated selection and a size of the concatenated selection may be output. For example, in FIG. 2, the portions P1 218, P2 220, P3 222, P4 224, or P5 226 may be concatenated to create the representation 142.

If a determination is made, at 404, that the size of the node exceeds the size constraints, then a determination may be made, at 410, whether the node is a leaf node. For example, in FIG. 2, when the size of the root node 206 exceeds the size constraints 204, the algorithm may determine whether the root node 206 is a leaf node or a parent node. A node may be a leaf node when the node includes content, such as text or graphics.

If a determination is made, at 410, that the node is a leaf node, then at least a portion of the leaf node may be selected for inclusion in the representation based on the size constraints, at 412. The selected portion of the leaf node may be combined with the previous selection, at 408. For example, in FIG. 2, if the algorithm if determines that one of the nodes is a leaf node, a portion of the leaf node may be selected for inclusion in the representation 142. To illustrate, a portion of one or more of the leaf nodes 212, 214 or 216 may be selected for inclusion in the representation 142. As another example, in FIG. 3, at least a portion of some of the child nodes of the root node (e.g., "product details") may be included in the representation 142. If the leaf node includes text, a portion of the text characters may be selected for inclusion in the representation 142. If the leaf node includes graphics (e.g., an image, a photograph, an illustration, or the like), a portion of the graphics may be selected for inclusion in the representation 142.

If a determination is made, at 410, that the node is not a leaf node (e.g., the node is a parent node), then the process proceeds to 414, where child nodes associated with the node may be determined. For example, in FIG. 2, the algorithm may determine that root node 206 is not a leaf node and may determine that the root node 206 is a parent node with the child node 208 and the child node 210. As another example, the algorithm may determine that the child node 208 is a parent node with the child nodes 212 and 214.

At 416, one or more of the child nodes may be selected based on the size constraints until (1) all child nodes are selected or (2) adding a next child node to the selection (e.g., the representation 142) would cause the selection to exceed the size constraints. For example, in FIG. 2, the algorithm may determine whether including each of the child nodes 208 and 210 in the representation would result in the representation exceeding the size constraints 204. The algorithm may include one or more of the child nodes 208 or 210 if including the child nodes 208 or 210 does not result in the resulting representation 142 exceeding the size constraints 204.

If all the child nodes are selected, at 416, the selected nodes may be combined with a previous selection and the concatenated selection output along with a size of the concatenated selection, at 408. In some implementations, a size of the child nodes or portions of the child nodes that were excluded from the representation 142 may be output.

If a child node has a size that exceeds the size constraints, at 416, the child node may be treated as a parent node, at 418. For example, the algorithm may be recursively called, starting at 402, with the parent node and the size constraints. The algorithm may perform at least some of the steps described in the process 400 with the parent node, such as determining any child nodes of the parent node etc.

Thus, an algorithm may recursively traverse a hierarchical structure of content provided by a site, selecting at least a portion of content of some nodes of the hierarchical structure for inclusion in a representation corresponding to the content. The representation may be created such that the content included in the representation does not exceed size constraints associated with the computing device 102. The representation may be organized using a structure similar to the content and include selected portions of the content.

FIG. 5 is a flow diagram of an example process 500 that includes treating a child node as a parent node according to some implementations. The process 500 is described as a recursive algorithm. However, in other implementations an algorithm that loops over the nodes at each level may be used to achieve results similar to the process 500. The process 500 may be performed by a presentation module such as the presentation module 112 of FIG. 1, the presentation module 132 or a combination of both.

At 502, content and size constraints may be received. The content may include a node of a structure of the content. For example, an algorithm may receive content (or a portion of content) that includes a node at a topmost level of the content.

At 504, a size of the node may be determined. For example, in FIG. 3, a bounding box such as the bounding box 302 or the bounding box 304 may be used to determine a size of the content. A bounding box having a specific size may be used at each level of the structure.

At 506, if the size of the node exceeds the size constraints, child nodes of the node may be identified. For example, in FIG. 2, if the root node 206 exceeds the size constraints 204, the child nodes 208 and 210 of the root node 206 may be identified.

At 508, a child node (e.g., from the child nodes that were identified at 506) may be repeatedly selected for inclusion in a representation until selecting a next child node would cause the representation to exceed the size constraints. For example, in FIG. 2, the algorithm may repeatedly select from the child nodes 208 or 210 for inclusion in the representation 142 until selecting one of the child nodes 208 or 210 would cause the representation 142 to exceed the size constraints 204.

At 510, if a child node exceeds the size constraints, then the child node may be treated as a parent node. For example, the algorithm may be recursively called (e.g., the process 500 may be restarted at 502) using the parent node.

At 512, if the next child node is a leaf node then an amount of the leaf node to add to the representation may be determined. For example, in FIG. 2, the algorithm may determine whether at least a portion of one or more of the child nodes 212, 214, or 216 is suitable for inclusion in the representation 142. The amount to be added to the representation may be determined such that the representation including the added amount does not exceed the size constraints.

At 514, the amount of the leaf node may be added to the selection. For example, in FIG. 2, the algorithm may add at least a portion of one or more of the child nodes 212, 214, or 216 to the representation 142. For example, a bounding box may be created for text of a leaf node. If adding the bounding box to the representation (e.g., previously selected content) would cause the representation to exceed the size constraints, then the algorithm may scan backwards, including the scanned characters in the representation, until including a next character would cause the representation to exceed the size constraints. If adding the bounding box to the representation (e.g., previously selected content) would not cause the representation to exceed the size constraints, then the algorithm may scan forward, including the scanned characters in the representation, until including a next character would cause the representation to exceed the size constraints.

At 516, a truncation indicator may be added. For example, the truncation indicator may be a default set of characters or a set of characters selected by a user of the computing device.

The user may select whether or not a truncation indicator is to be used. If the user specifies that a truncation indicator is to be used, the user may select one or more characters to be used as the truncation indicator or the algorithm may select a default truncation indicator. Prior to adding the truncation indicator to the representation, the algorithm may remove a number of characters corresponding to a size of the truncation indicator from the representation. For example, the algorithm may remove three characters from the representation before the algorithm adds the truncation indicator to a particular location.

At 518, the representation and a size of the representation may be output. For example, in FIG. 2, the algorithm may output the representation 142 and a size of the representation 142. In some implementations, a size of one or more portions of the content that were excluded from the representation 142 may be output.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computing device comprising:
   a display device;
   one or more processors;
   one or more computer-readable storage media storing instructions executable by the one or more processors to perform acts comprising:
      receiving a request to display digital content that is stored on a server device, the digital content accessible to the computing device over a network, a representation of the digital content organized using a hierarchical structure that includes a root node at a topmost level;
      determining one or more size constraints indicative of one or more dimensions of a first display area of the display device;
      determining whether a display of content associated with the root node exceeds the one or more size constraints;
      determining one or more child nodes at a first level that is lower in the hierarchical structure than the root node; and
      repeatedly selecting a next child node of the one or more child nodes at the first level for inclusion in a truncated representation of the digital content until selecting the next child node would cause display of content associated with the truncated representation to exceed the one or more size constraints; and
      displaying content associated with the truncated representation on the first display area of the display device.

2. The computing device of claim 1, the acts further comprising:
   determining that the next child node is a leaf node; and
   selecting a portion of content associated with the next child node for inclusion in the truncated representation, wherein a display of content associated with the truncated representation does not exceed the one or more size constraints.

3. The computing device of claim 1, the acts further comprising:
   determining that the next child node is a parent node;
   determining additional child nodes of the parent node; and
   repeatedly selecting a next additional child node of the additional child nodes for inclusion in the truncated representation of the digital content until selecting the next additional child node would cause display of content associated with the truncated representation to exceed the one or more size constraints.

4. The computing device of claim 2, wherein the representation of the digital content comprises a cross-platform convention to represent objects in one or more of hypertext markup language (HTML), extended HTML (XHTML), extended markup language (XML), or a document object model (DOM).

5. The computing device of claim 1, wherein the one or more size constraints associated with the first display area include one or more of a minimum pixel height, a maximum pixel height, a minimum pixel width, or a maximum pixel width.

6. A system comprising:
   one or more processors; and
   one or more computer-readable storage media storing instructions executable by the one or more processors to perform acts comprising:
      receiving digital content, wherein a representation of the digital content is organized according to a tree structure that includes a root node;
      determining a size constraint associated with a display area in which to display the representation of the digital content;
      repeatedly selecting a next child node of the root node and including at least a portion of the content of the selected child node in a truncated representation of the digital content until selecting the next child node would cause display of the truncated representation to exceed the size constraint; and
      refraining from including a remainder of the tree structure in the truncated representation.

7. The system of claim 6, wherein the size constraint comprises:
   a height range of the display area, the height range bounded by a minimum pixel height and a maximum pixel height, and
   a width range of the display area, the width range bounded by a minimum pixel width and a maximum pixel width.

8. The system of claim 6, wherein the representation of the digital content comprises at least one of a hypertext markup language (HTML), an extended HTML (XHTML), an extended markup language (XML), or a document object model (DOM).

9. The system of claim 6, the acts further comprising:
   determining that display of content of the next child node exceeds the size constraint;
   determining that the next child node comprises a parent node and identifying one or more additional child nodes of the parent node;
   determining that display of content of at least one child node of the one or more additional child nodes does not exceed the size constraint; and
   including at least a portion of the content of the at least one child node in the truncated representation of the digital content.

10. The system of claim 9, wherein including at least the portion of the content of the at least one child node in the truncated representation of the digital content comprises:

determining that including the content of the at least one child in the truncated representation would result in display of the truncated representation exceeding the size constraint.

11. The system of claim 10, the acts further comprising:
including a portion of the content of the at least one child in the truncated representation, the portion selected such that a size of the truncated representation does not exceed the size constraint.

12. A method performed by one or more processors executing instructions stored in a non-transitory computer-readable storage medium, the method comprising:
receiving digital content having a root node at its topmost level;
determining whether a size associated with displaying the content of the root node exceeds a size constraint;
identifying one or more child nodes of the root node;
repeatedly selecting a child node from the one or more child nodes for inclusion in a truncated subset of the content until selecting a next child node would cause displaying the truncated subset to exceed the size constraint;
determining that the next child node is a leaf node; and
selecting a portion of the next child node for inclusion in the subset such that the resulting displaying the subset does not exceed the size constraint.

13. The method of claim 12, wherein:
the size constraint is associated with a display area of a display device, and
the size constraint comprises at least one of a minimum height, a maximum height, a minimum width, or a maximum width.

14. The method of claim 12, the method further comprising:
adding a set of characters to the representation, the set of characters indicating that the selected portion of the content of the next child node was included in the representation while a remaining portion was excluded.

15. The method of claim 14, wherein the set of characters comprise an ellipsis.

16. The method of claim 12, further comprising:
determining that the next child node is a parent node, identifying additional child nodes of the parent node; and
repeatedly selecting content from an additional child node from the additional child nodes for inclusion in the truncated subset until selecting a next additional child node would cause displaying the truncated subset to exceed the size constraint.

17. The method of claim 12, further comprising:
determining that a next additional child node is the leaf node; and
selecting a portion of the next additional child node for inclusion in the subset such that displaying the truncated subset including the next additional child node does not exceed the size constraint.

18. One or more non-transitory computer-readable storage media comprising instructions executable by the one or more processors to perform acts comprising:
receiving a representation of digital content, the representation organized according to a tree structure starting at a root node;
creating a truncated representation of the digital content based on one or more size constraints associated with a display area of a display device;
determining that displaying content of the root node exceeds the one or more size constraints;
repeatedly selecting a next child node of the root node for inclusion in the truncated representation of the digital content until selecting the next child node would cause displaying the truncated representation to exceed the one or more size constraints.

19. The one or more non-transitory computer-readable storage media of claim 18, wherein the one or more size constraints associated with the display area include at least a minimum height, a maximum height, a minimum width, and a maximum width.

20. The one or more non-transitory computer-readable storage media of claim 18, the acts further comprising:
determining that the next child node comprises a parent node; and
identifying one or more additional child nodes of the parent node.

21. The one or more non-transitory computer-readable storage media of claim 20, further comprising:
determining that displaying content of the one or more additional child nodes would result in the truncated representation exceeding the one or more size constraints; and
including at least a portion of one additional child node of the one or more additional child nodes in the truncated representation of the digital content.

22. The one or more non-transitory computer-readable storage media of claim 18, wherein the representation includes at least one of hyptertext markup language (HTML) content or extended markup language content (XML).

23. The system of claim 10, the acts further comprising:
including the content of the at least one child in the truncated representation.

* * * * *